US012614974B2

(12) United States Patent
Hung

(10) Patent No.: US 12,614,974 B2
(45) Date of Patent: Apr. 28, 2026

(54) MULTI-INPUT POWER SYSTEM CONFIGURED TO RECEIVE AT LEAST TWO INPUT POWER SOURCES

(71) Applicant: ASIAN POWER DEVICES INC., Taoyuan City (TW)

(72) Inventor: Tsung-Liang Hung, Taoyuan City (TW)

(73) Assignee: ASIAN POWER DEVICES INC., Taoyuan City (TW)

( * ) Notice: Subject to any disclaimer, the term of this patent is extended or adjusted under 35 U.S.C. 154(b) by 189 days.

(21) Appl. No.: 18/605,183

(22) Filed: Mar. 14, 2024

(65) Prior Publication Data

US 2025/0219530 A1 Jul. 3, 2025

(30) Foreign Application Priority Data

Jan. 2, 2024 (TW) ................................. 113100058

(51) Int. Cl.
H02M 1/42 (2007.01)
H02M 1/12 (2006.01)
H02M 3/156 (2006.01)

(52) U.S. Cl.
CPC ........... H02M 1/4225 (2013.01); H02M 1/12 (2013.01); H02M 3/156 (2013.01)

(58) Field of Classification Search
CPC .... H02M 1/42; H02M 1/4208; H02M 1/4216; H02M 1/4225; H02M 1/4233; H02M 1/4241; H02M 1/425; H02M 1/4258; H02M 1/4266; H02M 2001/4275; H02M 2001/4283; H02M 2001/4291; H02M 5/2573; H02M 1/081; H02M 5/293;

H02M 7/12; H02M 3/10; H02M 3/125; H02M 3/13; H02M 3/135; H02M 3/145; H02M 3/15; H02M 3/155; H02M 3/156;
(Continued)

(56) References Cited

U.S. PATENT DOCUMENTS

| | | | |
|---|---|---|---|
| 7,898,111 B1 * | 3/2011 | Pistel | H02J 1/102 |
| | | | 307/82 |
| 8,169,804 B2 * | 5/2012 | Tan | H02M 1/4216 |
| | | | 363/65 |

(Continued)

*Primary Examiner* — Jeffrey A Gblende
(74) *Attorney, Agent, or Firm* — MUNCY, GEISSLER, OLDS & LOWE, P.C.

(57) ABSTRACT

A multi-input power system receives at least two input power sources, and includes at least two filter and rectification circuits, at least two boost PFC circuits, a DC-to-DC conversion circuit, and a control circuit. The filter and rectification circuits correspondingly receive the input power sources, and convert the input power sources into rectified voltages. The boost PFC circuits correspondingly receive the rectified voltages and perform a power factor correction on the rectified voltages to provide a conversion voltage. The DC-to-DC conversion circuit converts the conversion voltage into an output voltage. The control circuit receives power information corresponding to the input power sources and determines power supply status of the input power sources according to the power information to generate control signals. The control signals are provided to correspondingly control the boost PFC circuits to control the magnitude of the conversion voltage.

9 Claims, 3 Drawing Sheets

(58) Field of Classification Search
CPC ...... H02M 3/157; H02M 3/158; H02M 1/346;
H02M 3/1588; H02M 2003/1566; H02M
3/1582; H02M 3/1584; H02M 2003/1557;
H02M 1/0032; H02M 7/217; H02M
1/0025; H02M 1/0045; H02M 1/0009;
H02M 1/08; H02M 1/088; H02M 1/0048;
G05F 1/00; G05F 1/10; G05F 1/12; G05F
1/46; G05F 1/455; G05F 1/45; G05F
1/445; G05F 1/66; G05F 1/40; G05F
1/42; G05F 1/44; G05F 1/462; G05F
1/52; G05F 1/56; G05F 3/10; G05F 3/16;
G05F 3/18; G05F 3/185; G05F 3/20;
G05F 3/26; G05F 3/30; G05F 3/205;
G05F 3/22; G05F 3/24; G05F 3/222;
G05F 3/242; G05F 3/225; G05F 3/227;
G05F 3/245; G05F 3/247; G05F 3/262;
G05F 3/265; G05F 3/267; G05F 1/575;
H05B 39/048; B23K 11/24; H04B
2215/069
See application file for complete search history.

(56) References Cited

U.S. PATENT DOCUMENTS

| | | | | |
|---|---|---|---|---|
| 8,310,100 | B2 * | 11/2012 | Humphrey .............. | H02M 1/32 |
| | | | | 307/80 |
| 8,963,371 | B2 * | 2/2015 | Kinnard ................. | H02J 9/061 |
| | | | | 307/64 |
| 2010/0066171 | A1 * | 3/2010 | Thakur .................. | H02J 1/102 |
| | | | | 307/43 |

* cited by examiner

MULTI-INPUT POWER SYSTEM CONFIGURED TO RECEIVE AT LEAST TWO INPUT POWER SOURCES

BACKGROUND

Technical Field

The present disclosure relates to a multi-input power system, and more particularly to a multi-input power system that can control an output voltage thereof according to power supply status of input power sources.

Description of Related Art

The statements in this section merely provide background information related to the present disclosure and do not necessarily constitute prior art.

Please refer to FIG. 1, which shows a block circuit diagram of a related-art dual-input switching power converter. Specifically, it shows a dual-input switching power converter structure applied to an alternating current (AC), with two converters operating completely independently. Each independently operating power converter has a front-stage PFC (power factor correction) converter and a rear-stage DC-to-DC converter. In other words, the AC dual-input switching power converter shown in FIG. 1 is composed of two front-stage PFC converters and two rear-stage DC-to-DC converters. The two DC-to-DC converters are connected only at their output sides, and the characteristic is that the two converters can simultaneously operate, or by one of them, that is, one front-stage PFC corresponding to the AC input and one rear-stage DC-to-DC converter are used. The front-stage PFC converter can perform power factor correction for its respective AC power source, and the secondary side of the rear-stage DC-DC converter outputs power for supplying the power required by the system.

Specifically, as shown in FIG. 1, the dual-input switching power converter mainly includes a first PFC converter 131, a second PFC converter 132, a first DC-to-DC converter 141, and a second DC-to-DC converter 142. In particular, the "PFC" means the power factor correction. The first AC power source Vin1 is filtered and rectified by a first filter 111 and a first rectifier 121, and the first PFC converter 131 converts (for example, steps up) the filtered and rectified voltage, and then the first DC-to-DC converter 141 converts the stepped-up voltage to generate a first output voltage Vout1 for supplying the power required by the system.

Similarly, the second AC power source Vin2 is filtered and rectified by a second filter 112 and a second rectifier 122, and the second PFC converter 132 converts (for example, steps up) the filtered and rectified voltage, and then the second DC-to-DC converter 142 converts the stepped-up voltage to generate a second output voltage Vout2 for supplying the power required by the system.

However, since the related-art dual-input switching power converter requires two PFC converters (i.e., the first PFC converter 131 and the second PFC converter 132) and two DC-to-DC converters (i.e., the first DC-to-DC converter 141 and the second DC-to-DC converter 142), the circuit cost is high and the control complexity is high.

Therefore, how to design a multi-input power system to solve problems and technical bottlenecks in the existing technology has become a critical topic in this field.

SUMMARY

An objective of the preset disclosure is to provide a multi-input power system. The multi-input power system receives at least two input power sources, and each power source is an AC power source. The multi-input power system includes at least two filter-rectification circuits, at least two boost power factor correction circuits, a DC-to-DC conversion circuit, and a control circuit. The at least two filter-rectification circuits correspondingly receive the at least two input power sources, and convert the at least two input power sources into at least two rectified voltages. The at least two boost power factor correction circuits correspondingly receive the at least two rectified voltages, and perform a power factor correction to the rectified voltages to provide a conversion voltage. The DC-to-DC conversion circuit is connected to the at least two boost power factor correction circuits, and the DC-to-DC conversion circuit converts the conversion voltage into an output voltage. The control circuit receives at least two power information corresponding to the at least two input power sources, and determines at least two power supply status of the at least two input power sources according to the at least two power information to generate at least two control signals. The at least two control signals correspondingly control the at least two boost power factor correction circuits to control the magnitude of the conversion voltage.

In one embodiment, each boost power factor correction circuit includes an inductor, a switch, and a diode. The inductor includes a first terminal and a second terminal. The switch includes a first power terminal, a second power terminal, and a control terminal. The diode includes an anode and a cathode. The first terminal of the inductor is connected to the filter-rectification circuit, and the second terminal of the inductor is connected to the first power terminal of the switch and the anode of the second; the cathode of the diode is connected to the DC-to-DC conversion circuit; the second power terminal of the switch is grounded.

In one embodiment, each boost power factor correction circuit further includes a voltage-dividing circuit, a resistance adjustment circuit, and a controller. The voltage-dividing circuit receives the conversion voltage outputted from the boost power factor correction circuit, and divides the conversion voltage to acquire a divided voltage. The resistance adjustment circuit is connected to the voltage-dividing circuit. The controller receives the divided voltage, and control a turned-on time and/or a turned-off time of the switch according to the divided voltage so as to control the conversion voltage.

In one embodiment, the voltage-dividing circuit includes a first voltage-dividing resistor and a second voltage-dividing resistor. The voltage-dividing circuit receives the conversion voltage outputted from the boost power factor correction circuit, and divides the conversion voltage according to a resistance ratio between the first voltage-dividing resistor and the second voltage-dividing resistor to generate the divided voltage across the second voltage-dividing resistor.

In one embodiment, the resistance adjustment circuit is coupled between a ground and a common node of the first voltage-dividing resistor and the second voltage-dividing resistor. The resistance adjustment circuit includes a switch and an adjustment resistor. The adjustment resistor is coupled to the switch in series.

In one embodiment, when the switch is turned on, the adjustment resistor is coupled to the second voltage-dividing resistor in parallel.

In one embodiment, the number of the at least two input power sources are two, and the number of the at least two filter-rectification circuits is two, including a first filter-rectification circuit and a second filter-rectification circuit. The first filter-rectification circuit provides a first rectified voltage and the second filter-rectification circuit provides a second rectified voltage. When the first rectified voltage is greater than the second rectified voltage, a first control signal generated by the control circuit turns on the switch of a first resistance adjustment circuit, and a second control signal generated by the control circuit turns on the switch of a second resistance adjustment circuit.

In one embodiment, the number of the at least two boost power factor correction circuits are two, including a first boost power factor correction circuit and a second boost power factor correction circuit. A first controller of the first boost power factor correction circuit controls a duty cycle of a first switch to be decreased.

In one embodiment, the number of the at least two input power sources are two, and the number of the at least two filter-rectification circuits is two, including a first filter-rectification circuit and a second filter-rectification circuit. The first filter-rectification circuit provides a first rectified voltage and the second filter-rectification circuit provides a second rectified voltage. When the first rectified voltage is less than the second rectified voltage, the first control signal generated by the control circuit turns off the switch of the first resistance adjustment circuit, and the second control signal generated by the control circuit turns on the switch of the second resistance adjustment circuit.

In one embodiment, the number of the at least two boost power factor correction circuits are two, including a first boost power factor correction circuit and a second boost power factor correction circuit. A second controller of the second boost power factor correction circuit controls a duty cycle of a second switch to be decreased.

In one embodiment, the at least two power information are the size of the at least two input power sources, the size of the at least two rectified voltages, or dynamic power ratios of the at least two input power sources.

Accordingly, the multi-input power system proposed by the present disclosure has the following characteristics and advantages: (1) since only one DC-to-DC conversion circuits 30 is used, the advantages of simplification of the overall power supply structure with minimized component cost and volume can be acquired; (2) since the power factor correction circuit has the characteristic that the conversion efficiency is proportional to the input voltage, when multiple input voltages exist, selecting a power source with a high input voltage to be responsible for the task of supplying the main power or for the task of providing larger power capacity can achieve higher conversion efficiency.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
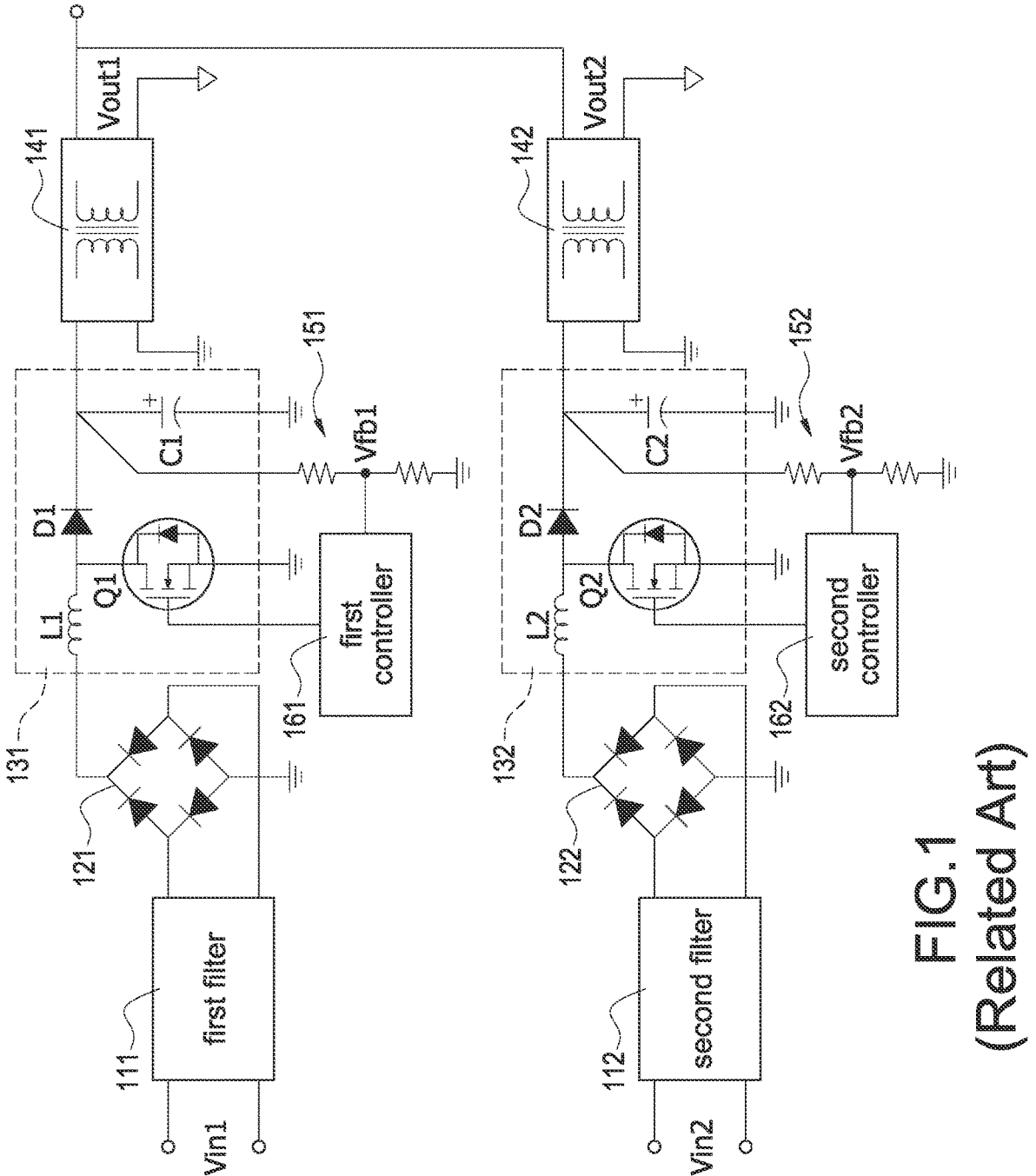
FIG. 1 is a block circuit diagram of a related-art dual-input switching power converter.

Reference will now be made to the drawing figures to describe the present disclosure in detail. It will be understood that the drawing figures and exemplified embodiments of present disclosure are not limited to the details thereof.

Figure 2:
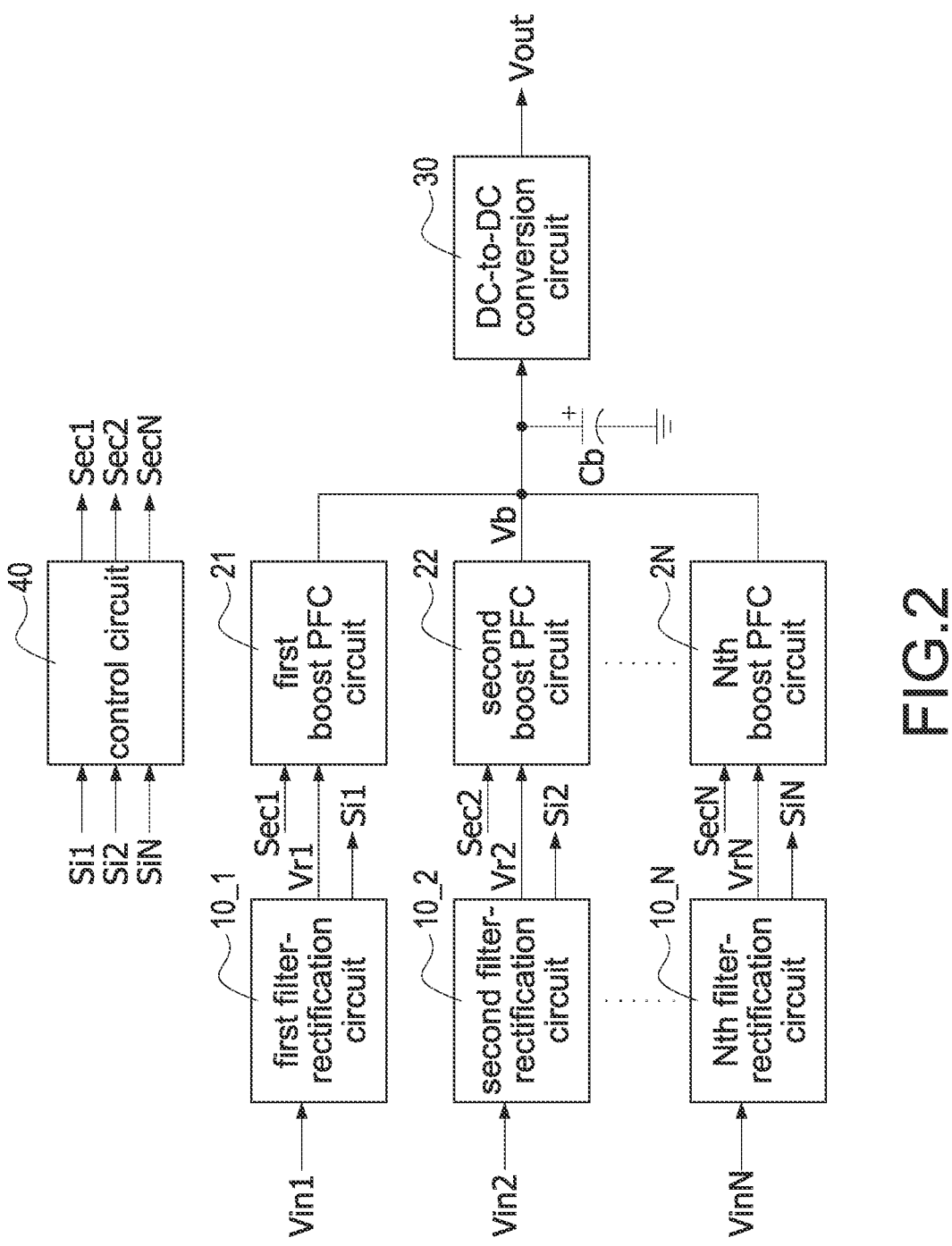
FIG. 2 is a block diagram of a multi-input power system according to the present disclosure.

Please refer to FIG. 2, which shows a block diagram of a multi-input power system according to the present disclosure. The multi-input power system receives at least two input power sources Vin1-VinN, including a first input power source Vin1, a second input power source Vin2, . . . , and a Nth input power source VinN. Each input power source Vin1-VinN is not limited to an AC power source or a DC power source, and the input power sources Vin1-VinN maybe also integrated AC and DC power sources. The multi-input power system includes at least two filter-rectification circuits 10_1-10_N (including a first filter-rectification circuit 10_1, a second filter-rectification circuit 10_2, . . . , and a Nth filter-rectification circuit 10_N), at least two boost power factor correction circuits 21-2N (including a first boost power factor correction circuit 21, a second boost power factor correction circuit 22, . . . , and a Nth boost power factor correction circuit 2N), a DC-to-DC conversion circuit 30, and a control circuit 40.

The at least two filter-rectification circuits 10_1-10_N correspondingly receive the at least two input power sources Vin1-VinN, and convert the at least two input power sources Vin1-VinN into at least two rectified voltages Vr1-VrN. That is, the first filter-rectification circuit 10_1 receives the first input power source Vin1, and converts the first input power source Vin1 into a first rectified voltage Vr1. The second filter-rectification circuit 10_2 receives the second input power source Vin2, and converts the second input power source Vin2 into a second rectified voltage Vr2. Similarly, the Nth filter-rectification circuit 10_N receives the Nth input power source VinN, and converts the Nth input power source VinN into a Nth rectified voltage VrN.

The at least two boost power factor correction circuits 21-2N, i.e., boost PFCs are correspondingly connected to the at least two filter-rectification circuits 10_1-10_N, correspondingly receive the at least two rectified voltages Vr1-VrN, and performs a power factor correction to the at least two rectified voltages Vr1-VrN to provide a conversion voltage Vb. That is, the first boost power factor correction circuit 21 is connected to the first filter-rectification circuit 10_1, receives the first rectified voltage Vr1, and performs the power factor correction to the first rectified voltage Vr1 to provide the conversion voltage Vb. The second boost power factor correction circuit 22 is connected to the second filter-rectification circuit 10_2, receives the second rectified voltage Vr2, and performs the power factor correction to the second rectified voltage Vr2 to provide the conversion voltage Vb. Similarly, the Nth boost power factor correction circuit 2N is connected to the Nth filter-rectification circuit 10_N, receives the Nth rectified voltage VrN, and performs the power factor correction to the Nth rectified voltage VrN to provide the conversion voltage Vb.

The DC-to-DC conversion circuit 30 is connected to the at least two boost power factor correction circuits 21-2N, and the DC-to-DC conversion circuit 30 converts the conversion voltage Vb into an output voltage Vout.

The control circuit 40 receives at least two power information Si1-SiN corresponding to the at least two input power sources Vin1-VinN, and determines at least two power supply status of the at least two input power sources Vin1-VinN according to the at least two power information Si1-SiN to generate at least two control signals Sec1-SecN. Specifically, the first input power source Vin1 corresponds the first power information Si1, the second input power source Vin2 corresponds the second power information Si2, . . . , and the Nth input power source VinN corresponds the Nth power information SiN. In particular, the at least two power information Si1-SiN are, for example but not limited to, the size of the at least two input power sources Vin1-VinN, the size of the at least two rectified voltages Vr1-VrN, or dynamic power ratios of the at least two input power sources Vin1-VinN. However, the present disclosure is not limited to this information. All electrical information related to the input power source may be used as the power information Si1-SiN of the present disclosure. Therefore, the control circuit 40 determines the power supply status of the first input power source Vin1 according to the first power information Si1 to generate the first control signal Sec1. The control circuit 40 determines the power supply status of the second input power source Vin2 according to the second power information Si2 to generate the second control signal Sec2. Similarly, the control circuit 40 determines the power supply status of the Nth input power source VinN according to the Nth power information SiN to generate the Nth control signal SecN.

Therefore, the at least two control signals Sec1-SecN correspondingly control the at least two boost power factor correction circuits 21-2N to control the magnitude of the conversion voltage Vb to further control the magnitude of output voltage Vout.

Figure 3:
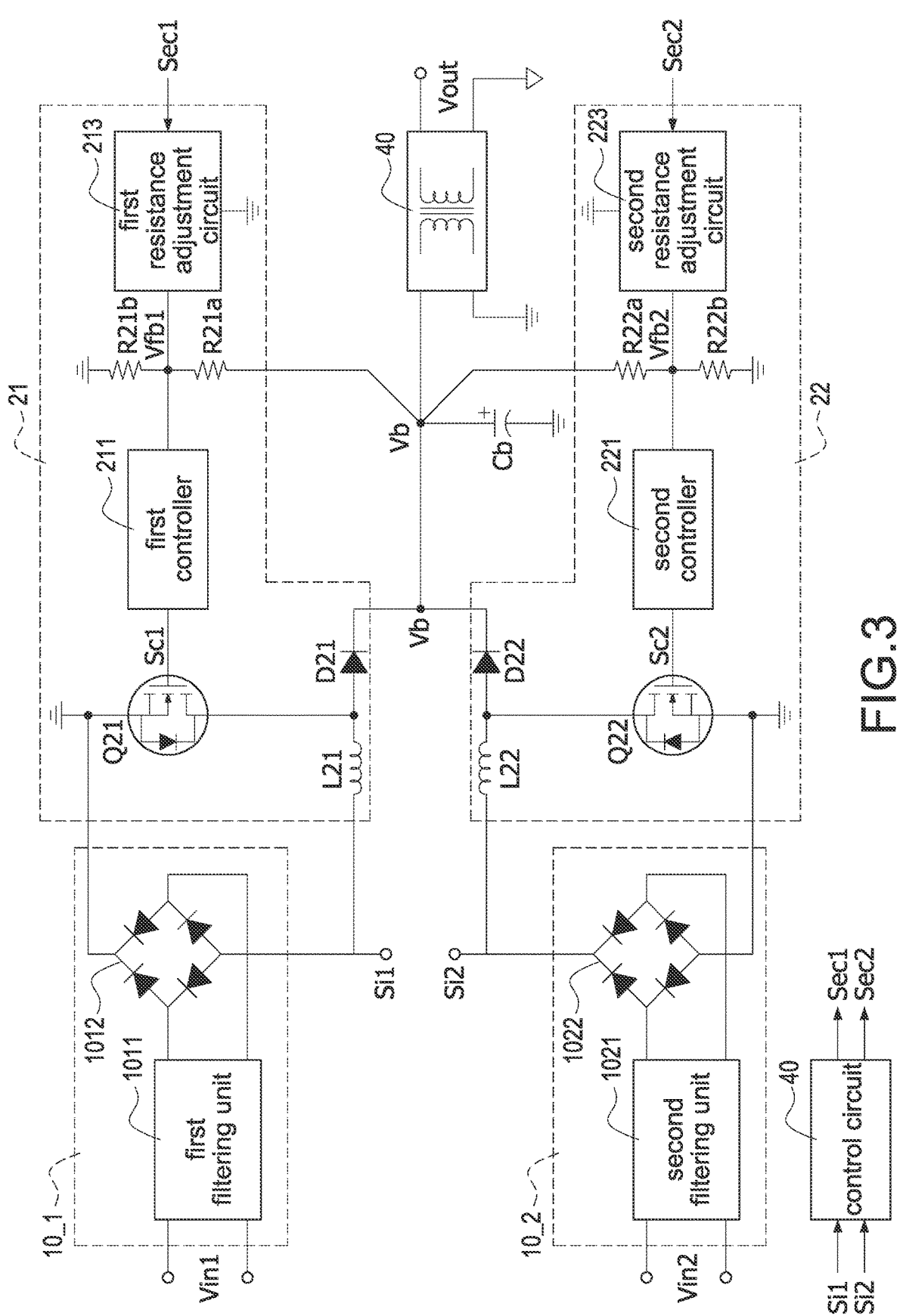
FIG. 3 is a block circuit diagram of the multi-input power system according to the present disclosure.

Please refer to FIG. 3, which shows a block circuit diagram of the multi-input power system according to the present disclosure. For the convenience of explanation, two input power sources are taken as an example in FIG. 3. The first filter-rectification circuit 10_1 receives the first input power source Vin1, and converts the first input power source Vin1 into the first rectified voltage Vr1. The second filter-rectification circuit 10_2 receives the second input power source Vin2, and converts the second input power source Vin2 into the second rectified voltage Vr2.

The first boost power factor correction circuit 21 is connected to an output side of the first filter-rectification circuit 10_1 to receive the first rectified voltage Vr1. Specifically, the first boost power factor correction circuit 21 includes a first inductor L21, a first switch Q21, and a first diode D21. The first inductor L21 includes a first terminal and a second terminal. The first switch Q21 includes a first power terminal, a second power terminal, and a control terminal. The first diode D21 includes an anode and a cathode. The first terminal of the first inductor L21 is connected to the output side of the first filter-rectification circuit 10_1 to receive the first rectified voltage Vr1. The second terminal of the first inductor L21 is connected to the first power terminal of the first switch Q21 and the anode of the first diode D21. The cathode of the first diode D21 is connected to a first terminal of a capacitor Cb. The second power terminal of the first switch Q21 and a second terminal of the capacitor Cb are grounded.

The second boost power factor correction circuit 22 is connected to an output side of the second filter-rectification circuit 10_2 to receive the second rectified voltage Vr2. Specifically, the second boost power factor correction circuit 22 includes a second inductor L22, a second switch Q22, and a second diode D22. The second inductor L22 includes a first terminal and a second terminal. The second switch Q22 includes a first power terminal, a second power terminal, and a control terminal. The second diode D22 includes an anode and a cathode. The first terminal of the second inductor L22 is connected to the output side of the second filter-rectification circuit 10_2 to receive the second rectified voltage Vr2. The second terminal of the second inductor L22 is connected to the first power terminal of the second switch Q22 and the anode of the second diode D22. The cathode of the second diode D22 is connected to a first terminal of the capacitor Cb. The second power terminal of the second switch Q22 and the second terminal of the capacitor Cb are grounded.

The first boost power factor correction circuit 21 further includes a first controller 211, a first voltage-dividing circuit 212, and a first resistance adjustment circuit 213. The first voltage-dividing circuit 212 includes a first voltage-dividing resistor R21a and a second voltage-dividing resistor R21b. The first voltage-dividing circuit 212 receives the conversion voltage Vb outputted from the first boost power factor correction circuit 21, and divides the conversion voltage Vb according to a resistance ratio between the first voltage-dividing resistor R21a and the second voltage-dividing resistor R21b to generate a first divided voltage Vfb1 across the second voltage-dividing resistor R21b, that is, $Vfb1=Vb*(R21b/(R21a+R21b))$.

The second boost power factor correction circuit 22 further includes a second controller 221, a second voltage-dividing circuit 222, and a second resistance adjustment circuit 223. The second voltage-dividing circuit 222 includes a first voltage-dividing resistor R22a and a second voltage-dividing resistor R22b. The second voltage-dividing circuit 222 receives the conversion voltage Vb outputted from the second boost power factor correction circuit 22, and divides the conversion voltage Vb according to a resistance ratio between the first voltage-dividing resistor R22a and the second voltage-dividing resistor R22b to generate a second divided voltage Vfb2 across the second voltage-dividing resistor R22b, that is, $Vfb2=Vb*(R22b/(R22a+R22b))$.

The first controller 211 receives the first divided voltage Vfb1, and controls the time of turning on and turning off the first switch Q21 according to the magnitude of the first divided voltage Vfb1, i.e., a duty cycle of the first switch Q21 is controlled. Therefore, as long as the conversion voltage Vb is too low (that is, the received first divided voltage Vfb1 is too low), the first controller 211 controls the duty cycle of the first switch Q21 to increase so that the first boost power factor correction circuit 21 increases the first rectified voltage Vr1 to acquire the increased conversion voltage Vb. On the contrary, if the conversion voltage Vb is too high (that is, the received first divided voltage Vfb1 is too high), the first controller 211 controls the duty cycle of the first switch Q21 to decrease so that the first boost power factor correction circuit 21 decreases the first rectified voltage Vr1 to acquire the decreased conversion voltage Vb.

More specifically, the first resistance adjustment circuit 213 is connected to the first voltage-dividing resistor R21a and the second voltage-dividing resistor R21b of the first voltage-dividing circuit 212. In this embodiment, the first resistance adjustment circuit 213 includes a switch and a first adjustment resistor connected in series, and the series-connected structure is connected between a common node of the first voltage-dividing resistor R21a and the second voltage-dividing resistor R21b and a ground. When the first control signal Sec1 turns off the switch, an equivalent resistance of the second voltage-dividing resistor R21b of the first voltage-dividing circuit 212 does not change since the first adjustment resistor is not connected to the second voltage-dividing resistor R21*b* in parallel. On the contrary, when the first control signal Sec1 turns on the switch, an equivalent resistance of the second voltage-dividing resistor R21*b* of the first voltage-dividing circuit 212 changes to be equal to the second voltage-dividing resistor R21*b* connected to the first adjustment resistor in parallel since the first adjustment resistor is connected to the second voltage-dividing resistor R21*b* in parallel. Therefore, different first divided voltages Vfb1 can be generated by dividing the conversion voltage Vb as described above, and thus different output voltages Vout can be acquired.

The second controller 221 receives the second divided voltage Vfb2, and controls the time of turning on and turning off the second switch Q22 according to the magnitude of the second divided voltage Vfb2, i.e., a duty cycle of the second switch Q22 is controlled. Therefore, as long as the conversion voltage Vb is too low (that is, the received second divided voltage Vfb2 is too low), the second controller 221 controls the duty cycle of the second switch Q22 to increase so that the second boost power factor correction circuit 22 increases the second rectified voltage Vr2 to acquire the increased conversion voltage Vb. On the contrary, if the conversion voltage Vb is too high (that is, the received second divided voltage Vfb2 is too high), the second controller 221 controls the duty cycle of the second switch Q22 to decrease so that the second boost power factor correction circuit 22 decreases the second rectified voltage Vr2 to acquire the decreased conversion voltage Vb.

More specifically, the second resistance adjustment circuit 223 is connected to the first voltage-dividing resistor R22*a* and the second voltage-dividing resistor R22*b* of the second voltage-dividing circuit 222. In this embodiment, the second resistance adjustment circuit 223 includes a switch and a second adjustment resistor connected in series, and the series-connected structure is connected between a common node of the first voltage-dividing resistor R22*a* and the second voltage-dividing resistor R22*b* and the ground. When the second control signal Sec2 turns off the switch, an equivalent resistance of the second voltage-dividing resistor R22*b* of the second voltage-dividing circuit 222 does not change since the second adjustment resistor is not connected to the second voltage-dividing resistor R22*b* in parallel. On the contrary, when the second control signal Sec2 turns on the switch, an equivalent resistance of the second voltage-dividing resistor R22*b* of the second voltage-dividing circuit 222 changes to be equal to the second voltage-dividing resistor R22*b* connected to the second adjustment resistor in parallel since the second adjustment resistor is connected to the second voltage-dividing resistor R22*b* in parallel. Therefore, different second divided voltages Vfb2 can be generated by dividing the conversion voltage Vb as described above, and thus different output voltages Vout can be acquired.

The DC-to-DC conversion circuit 30 is connected to the at least two boost power factor correction circuits 21-2N, and the DC-to-DC conversion circuit 30 converts the conversion voltage Vb into the output voltage Vout to supply the power required by the system.

As mentioned above, the control circuit 40 receives at least two power information Si1-SiN corresponding to the at least two input power sources Vin1-VinN, and determines at least two power supply status of the at least two input power sources Vin1-VinN according to the at least two power information Si1-SiN to generate at least two control signals Sec1-SecN. In particular, the at least two power information Si1-SiN are, for example but not limited to, the size of the at least two input power sources Vin1-VinN, the size of the at least two rectified voltages Vr1-VrN, or dynamic power ratios of the at least two input power sources Vin1-VinN. However, the present disclosure is not limited to this information. All electrical information related to the input power source may be used as the power information Si1-SiN of the present disclosure.

As shown in FIG. 3, taking the rectified voltages Vr1-VrN as an example to illustrate. It is assumed that the first rectified voltage Vr1 is greater than the second rectified voltage Vr2, and therefore the control circuit 40 can determine that the first rectified voltage Vr1 is greater than the second rectified voltage Vr2 based on the received first power information Si1 and second power information Si2, for example, but not limited to, the first power information Si1 is greater than the second power information Si2. Therefore the control circuit 40 generates the first control signal Sec1 and the second control signal Sec2, and provides the first control signal Sec1 and the second control signal Sec2 to the first boost power factor correction circuit 21 and the second boost power factor correction circuit 22 respectively so that the first control signal Sec1 turns on the switch of the first resistance adjustment circuit 213 and the second control signal Sec2 turns off the switch of the second resistance adjustment circuit 223.

In this condition, since the switch of the first resistance adjustment circuit 213 is turned on, the first divided voltage Vfb1 is decreased since equivalent resistance of the second voltage-dividing resistor R21*b* becomes smaller, and therefore the first controller 211 controls the duty cycle of the first switch Q21 to be decreased so that the first boost power factor correction circuit 21 decreases the first rectified voltage Vr1 to acquire the decreased conversion voltage Vb. Finally, the DC-to-DC conversion circuit 30 converts the conversion voltage Vb into the output voltage Vout to supply the power required by the system.

On the contrary, when the first rectified voltage Vr1 is less than the second rectified voltage Vr2, the second control signal Sec2 turns on the switch of the second resistance adjustment circuit 223 and the first control signal Sec1 turns off the switch of the first resistance adjustment circuit 213. In this condition, since the switch of the second resistance adjustment circuit 223 is turned on, the second divided voltage Vfb2 is decreased since equivalent resistance of the second voltage-dividing resistor R22*b* becomes smaller, and therefore the second controller 221 controls the duty cycle of the second switch Q22 to be decreased so that the second boost power factor correction circuit 22 decreases the second rectified voltage Vr2 to acquire the decreased conversion voltage Vb. Finally, the DC-to-DC conversion circuit 30 converts the conversion voltage Vb into the output voltage Vout to supply the power required by the system.

Accordingly, the control circuit 40 receives the power information Si1-SiN (i.e., the first power information Si1 and the second power information Si2 in this embodiment), and determines one of the input power sources Vin1-VinN (i.e., the first input power source Vin1 and the second input power source Vin2 in this embodiment) based on the power information Si1-SiN is responsible for the task of supplying the main power or for the task of providing larger power capacity. Therefore, not only acquiring the advantages of minimizing component cost and volume by using only one DC-to-DC conversion circuits 30 (compared to the related art, which requires the use of two DC-to-DC conversion circuits 141,142), but also acquiring the higher conversion efficiency and/or better power supply quality by selecting an input power source with a higher input voltage or selecting an input power supply with a higher dynamic ratio based on the power information Si1-SiN.

In summary, the present disclosure has the following features and advantages:

1. Since only one DC-to-DC conversion circuits 30 is used, the advantages of simplification of the overall power supply structure with minimized component cost and volume can be acquired.

2. Since the power factor correction circuit has the characteristic that the conversion efficiency is proportional to the input voltage, when multiple input voltages exist, selecting a power source with a high input voltage to be responsible for the task of supplying the main power or for the task of providing larger power capacity can achieve higher conversion efficiency.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A multi-input power system, configured to receive at least two input power sources, wherein each input power source is an AC power source, the multi-input power system comprising:

at least two filter-rectification circuits configured to correspondingly receive the at least two input power sources, and convert the at least two input power sources into at least two rectified voltages;

at least two boost power factor correction circuits configured to correspondingly receive the at least two rectified voltages, and perform a power factor correction to the rectified voltages to provide a conversion voltage, wherein each boost power factor correction circuit comprises:

an inductor comprising a first terminal and a second terminal;

a switch comprising a first power terminal, a second power terminal, and a control terminal;

a diode comprising an anode and a cathode;

a voltage-dividing circuit configured to receive the conversion voltage outputted from the boost power factor correction circuit, and divide the conversion voltage to acquire a divided voltage;

a resistance adjustment circuit connected to the voltage-dividing circuit; and a controller configured to receive the divided voltage, and control a turned-on time and/or a turned-off time of the switch according to the divided voltage so as to control the conversion voltage, wherein the first terminal of the inductor is connected to the filter-rectification circuit, and the second terminal of the inductor is connected to the first power terminal of the switch and the anode of the diode; the cathode of the diode is connected to the DC-to-DC conversion circuit; the second power terminal of the switch is grounded;

a DC-to-DC conversion circuit connected to the at least two boost power factor correction circuits, and the DC-to-DC conversion circuit configured to convert the conversion voltage into an output voltage; and a control circuit configured to receive at least two power information corresponding to the at least two input power sources, and determine at least two power supply status of the at least two input power sources according to the at least two power information to generate at least two control signals, wherein the at least two control signals are configured to correspondingly control the at least two boost power factor correction circuits to control the magnitude of the conversion voltage.

2. The multi-input power system as claimed in claim 1, wherein the voltage-dividing circuit comprises:

a first voltage-dividing resistor and a second voltage-dividing resistor, wherein the voltage-dividing circuit is configured to receive the conversion voltage outputted from the boost power factor correction circuit, and divide the conversion voltage according to a resistance ratio between the first voltage-dividing resistor and the second voltage-dividing resistor to generate the divided voltage across the second voltage-dividing resistor.

3. The multi-input power system as claimed in claim 2, wherein the resistance adjustment circuit is coupled between a ground and a common node of the first voltage-dividing resistor and the second voltage-dividing resistor, and the resistance adjustment circuit comprises:

a switch, and an adjustment resistor coupled to the switch in series.

4. The multi-input power system as claimed in claim 3, wherein when the switch of the resistance adjustment circuit is turned on, the adjustment resistor is coupled to the second voltage-dividing resistor in parallel.

5. The multi-input power system as claimed in claim 4, wherein a number of the at least two input power sources are two, and a number of the at least two filter-rectification circuits is two, comprising a first filter-rectification circuit and a second filter-rectification circuit; the first filter-rectification circuit is configured to provide a first rectified voltage and the second filter-rectification circuit is configured to provide a second rectified voltage, wherein when the first rectified voltage is greater than the second rectified voltage, a first control signal generated by the control circuit is configured to turn on the switch of a first resistance adjustment circuit, and a second control signal generated by the control circuit is configured to turn on the switch of a second resistance adjustment circuit.

6. The multi-input power system as claimed in claim 5, wherein a number of the at least two boost power factor correction circuits are two, comprising a first boost power factor correction circuit and a second boost power factor correction circuit, wherein a first controller of the first boost power factor correction circuit controls a duty cycle of a first switch to be decreased.

7. The multi-input power system as claimed in claim 4, wherein a number of the at least two input power sources are two, and a number of the at least two filter-rectification circuits is two, comprising a first filter-rectification circuit and a second filter-rectification circuit; the first filter-rectification circuit is configured to provide a first rectified voltage and the second filter-rectification circuit is configured to provide a second rectified voltage, wherein when the first rectified voltage is less than the second rectified voltage, a first control signal generated by the control circuit is configured to turn off the switch of a first resistance adjustment circuit, and a second control signal generated by the control circuit is configured to turn on the switch of a second resistance adjustment circuit.

8. The multi-input power system as claimed in claim 7, wherein a number of the at least two boost power factor correction circuits are two, comprising a first boost power factor correction circuit and a second boost power factor correction circuit, wherein a second controller of the second boost power factor correction circuit controls a duty cycle of a second switch to be decreased.

9. The multi-input power system as claimed in claim 1, wherein the at least two power information are the size of the at least two input power sources, the size of the at least two rectified voltages, or dynamic power ratios of the at least two input power sources.

\* \* \* \* \*